United States Patent [19]

Bassi

[11] 4,229,695

[45] Oct. 21, 1980

[54] ROTATIONAL SPEED TRANSDUCER HAVING GREATER LOW SPEED DISCRIMINATION

[75] Inventor: Aldo Bassi, Milan, Italy

[73] Assignee: Alfa Romeo S.p.A., Milan, Italy

[21] Appl. No.: 886,438

[22] Filed: Mar. 14, 1978

[30] Foreign Application Priority Data

Mar. 16, 1977 [IT] Italy .............................. 21309 A/77

[51] Int. Cl.[2] .......................... G01P 3/48; G04F 10/04
[52] U.S. Cl. ..................................... 324/166; 368/118
[58] Field of Search ............... 324/166, 173, 174, 175, 324/186; 123/117 D; 364/565; 235/92 RQ

[56] References Cited

U.S. PATENT DOCUMENTS 4,093,916  6/1978  Summer .............................. 324/166

Primary Examiner—Rudolph V. Rolinec
Assistant Examiner—Walter E. Snow
Attorney, Agent, or Firm—Holman & Stern

[57] ABSTRACT

A digital transducer for rotary shaft speed has a resolution which varies automatically with shaft speed. A wheel, keyed to the shaft, is partitioned into plural sectors by angularly spaced notches, the angular spacing between successive notches increasing in a fixed ratio to define respective preselected speed zone within a range of such zones. A first counter is arranged to count fixed frequency clock pulses and to be reset after each shaft revolution. A variable frequency pulse train is generated by a sensor arranged to sense the passage of each notch. Upon receipt of each pulse in the variable frequency pulse train, a comparator compares the count in the first counter with stored reference numbers which are related to the clock pulse frequency and to the ratio of successive angles between the notches. A second counter, also reset once during each shaft revolution, counts pulses in the variable frequency pulse train. When the comparator finds the first counter contents equal to a reference number, the contents of both counters are displayed as a function of shaft speed.

5 Claims, 1 Drawing Figure

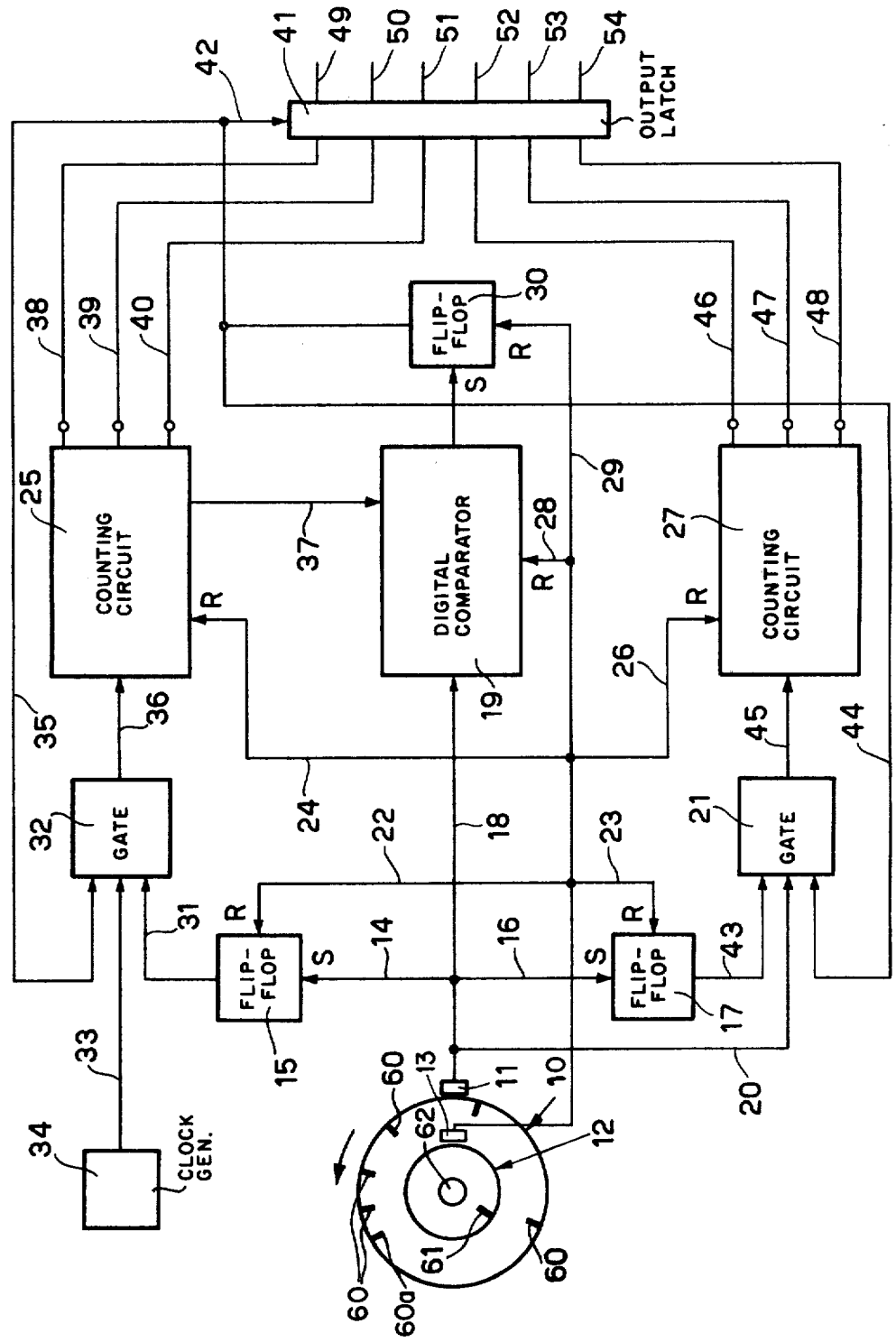

ROTATIONAL SPEED TRANSDUCER HAVING GREATER LOW SPEED DISCRIMINATION

BACKGROUND OF THE INVENTION

It is known that in many regulation system, the detection of a magnitude used as a parameter for the regulation must be so carried out as to keep into account the different sensitivity the magnitude concerned has as a function of its instantaneous value in the process which is being monitored. Stated another way, it is required that the magnitude concerned be detected with a different resolution degree as a function of the value such magnitude takes within the range of its variability.

This is the case, for example, with the operative parameters of an internal combustion engine, such as speed of rotation, angle of the throttling butterfly and others, which are generally employed as regulation parameters for governing the working conditions of such engine, such as carburation, ignition advance and others.

For example, in the regulation processes in which a higher regulation accuracy is required at low RPMs than at high RPMs of an engine, it is imperative that the speed signal delivered by the transducer displays a considerable number of digital values in correspondence with the low RPMs, whereas, at higher RPMs a lower number of digital values is requested.

SUMMARY OF THE INVENTION

An object of the present invention is a transducer of the speed of rotation of a shaft which is rotated at a variable speed, more particularly the shaft of an internal combustion engine, which is capable of delivering a digital signal having a different degree of discrimination of the values within the speed variation range, that is, a transducer having a different distribution of the values (a greater or a smaller number of data values) in correspondence with the different RPMs of the engine. According to the invention the shaft rotation speed range is subdivided into a preselected number of zones represented by respective zone limit values having increments which increase according to a predetermined function as the magnitude of the speed increases, each zone being further partitioned into a preselected number of intervals represented by respective interval limit values having increments which increase according to another predetermined function as the speed increases.

More particularly, the transducer according to this invention comprises pulse generating first means operatively connected to the rotary shaft adapted to generate, at each revolution of the shaft, a train of first pulses in number at least equal to the number of zones into which the speed variation range is partitioned and having spacings which increase as the increments of said zone limit values and are also variable as a function of the speed of variation of the same shaft, second pulse generating means adapted to generate second constant-frequency pulses, first pulse counting means adapted to count the first pulses aforesaid second pulse counting means adapted to count the second pulses aforesaid, and comparing means actuated by each first pulse to compare the number of second pulses counted by said second counting means with a preselected succession of reference numbers comprised between a minimum number and a maximum number and to deliver an output signal if said counted number of second pulses is equal to any reference number, said output signal being capable of acting on said first and second counting means so as to stop their counting operation and to cause delivering of a first digital signal corresponding to the number of first pulses counted by said first counting means and representative of the zone of the speed range in which the instantaneous value of the rotating shaft speed lies and, respectively, of a second digital signal corresponding to the number of second pulses counted by the second counting means and representative of the zone interval of the same speed value range in which the instantaneous value of the speed of the rotating shaft is contained and resetting means adapted to reset said first and second counting means and said comparing means at the end of each revolution of the shaft.

Features and advantages of the invention will become more clearly apparent from the accompanying drawing which is a block diagram, given by way of nonlimiting example, of a preferred embodiment of the invention.

BRIEF DESCRIPTION OF A PREFERRED EMBODIMENT

In the drawing, the numeral 10 indicates a wheel having reference notches which is integral with a shaft 62, the latter being rotated at a speed which is proportional to the RPMs of an internal combustion engine. The wheel 10 carries on its peripheral surface six notches, 60, the five notches past the first one, 60a, defining five circular sectors: in the example shown, these sectors have their angular widths increasing in a direction opposite to the direction of rotation of the wheel, consistently with a predetermined function which reproduces a corresponding predetermined function of the width of a plurality of zones into which the shaft speed range is considered as subdivided, each notch 60 corresponding to a respective zone limit value of the shaft speed.

In the particular case herein, each circular sector has an angular extension which has a ratio of 31:23 with preceding sector.

At 12 there is indicated a second wheel integral with the same shaft 62 to which the wheel 10 is keyed. The wheel 12 has one notch only, 61, which is arranged between the last and the first of the reference notches 60 of the wheel 10.

The numeral 11 indicates a sensor, placed confrontingly relative to the wheel 10, the sensor being capable of delivering a pulse whenever a notch 60 travels past it, and 13 is a sensor placed in front of the wheel 12 and delivers, also, a pulse whenever the notch 61 of the same wheel 12 passes in front of it. The two sensors 11 and 13 can be of optical-electric or magnetic type, or of any other type adapted to detect the presence of the notches.

The output of the sensor 11 is connected by a line 14 to the set input (S) of a flipflop 15 and, by a line 16, to the set (S) input of a flipflop 17. The same output of the sensor 11 is also connected by a line 18 to a digital comparator 19 and, by a line 20, to an input of an And-type gate element 21. The output of the sensor 13 is connected, through a line 22, to the reset (R) input of the flipflop 15 and, through a line 23, to the reset (R) of the flipflop 17, the same output of the sensor 13 being then connected through a line 24 to the zero reset input (R) of a pulse counter 25 and, through a line 26, to the similar input of a pulse counter 27.

The output of the sensor 13 is finally connected by a line 28 to a reset input of the comparator 19, and, by a line 29, to the reset (R) input of a flipflop 30; which is able to deliver either a "stop" signal or an "enable" signal according to whether it receives a signal from the comparator 19 or from the sensor 13.

The output of the flipflop 15 is connected by a line 31 to an input of an AND-type gate element 32 to which comes also, through a line 33, constant-frequency pulses delivered by a clock generator 34. The gate element 32 also receives, by a line 35, the output signal of the flipflop 30. The output of the gate element 32 is then connected, by a line 36, to the counting input of the counter 25.

From the counter 25 emerges a line 37 which reaches the comparator 19 and there emerge also three lines 38, 39, 40, which are connected to an output latch 41 of the transducer. The block 41 receives also the output signal of the flipflop 30, through a line 42. The flipflop 17 has its output connected, by a line 43, to an input of the gate element 21 and the latter receives also, through a line 44, the output signal of the flipflop 30.

The output of the gate element 21 is connected by a line 45 to the counting input of the counter 27, which has its outputs also connected to the output latch 41, through lines 46, 47, 48. At 49, 50, 51, 52, 53, 54 are indicated six output lines for the digital rotational speed signal of the transducer.

The transducer detects the speed of rotation of the shaft integral with the wheels 10 and 12 at every revolution of the shaft, since, as will be made clear hereinafter said transducer receives an enable signal and a reset signal during said revolution, so that the speed signal delivered by the transducer is continually updated.

The operation of the transducer is as follows:

The flipflop 17 delivers an enable signal to the gate element 21 when the sensor 11 delivers a first pulse corresponding to a first notch of the wheel 10, through the line 16. If a further enable signal coming from the flipflop 30 is, applied to the gate element 21 through the line 66 the gate 21 enables the line 20 to transfer to the line 45 the pulses after the first one which are delivered by the sensor 11 every time that a further notch 60 of the wheel 10 goes past the sensor itself.

The counter 27 counts the pulses it receives until such time as the gate 21 receives from the line 44 a stop signal delivered by the flipflop 30.

Since every one of the pulses delivered by the notched wheel 10 indicates the limit value of a different zone of the rotation speed variation range of the shaft integral with the wheel 10, the number of pulses summed in the counter 27 defines the zone of the speed range in which the particular instantaneous value of the speed is located, as detected by the transducer. Particularly, the output of the counter 27 consists of an encoded number in a 3-bit binary code which identifies the zone concerned as a function of the number of pulses received by the counter.

Simultaneously, the flipflop 15 delivers an enable signal to the gate element 32 when the sensor 11 delivers a first pulse, which corresponds to a first notch of the wheel 10, through the line 14. If the gate 32 receives through the line 35 a further enable signal of consent from the flipflop 30, it transfers from line 33 to line 36 the constant-frequency pulses coming from the clock generator 34.

The counter 25 effects the count of said constant-frequency pulses and sends to the comparator 19, via the line 37, a count signal which is representative of the number of pulses which has been summed up.

Each time the comparator 19 also receives, through the line 18, a further pulse signal from the sensor 11, it performs a comparison between the final count signal delivered to it by the counter 25 and a preset succession of binary-encoded reference numbers. These reference numbers are comprised between a minimum and a maximum number, which are selected as a function of the constant frequency of the pulses generated by the generator 36 and of the angular extension ratio of the sectors of the wheel 10. Particularly, in the assumed case that the extension ratio is 31:23 and further assuming that the constant frequency of the pulses generated by generator 34 is such that thirty-one is the (maximum) number of pulses generated during the time period necessary for the shaft 62 to rotate the angular distance between the first notch 60a and any further notch 60 at the lower limit of the speed zone corresponding to said further notch, and twenty-four is the (minimum) number of pulses generated during the time period necessary for the shaft 62 to rotate the same angular distance at the upper limit of the same speed zone, the preset reference numbers are comprised between twenty-four and thirty-one. The comparator 19 generates an output signal which switches the flipflop 30 to a state which allows it to open the output latch 41 towards the outside for delivering the digital value of the speed of rotation of the shaft, 62 which is integral with the wheels 10 and 12. The speed signal appearing at the output of the latch 41 is composed by the combination of the 3-bit number carried by the lines 46, 47, 48, which indicates the speed range in which the instantaneous value of the detected speed is located, with the 3-bit number which defines the interval of the same zone in which the instantaneous value of the detected speed is located, as transferred via the lines 38, 39, 40.

The signal of the flipflop 30 also controls the latching of gates 21 and 32 and thus also the latching of the counters 25 and 27.

The subsequent arrival of a pulse coming from the sensor 13, when the single notch 61 of the wheel 12 passes in front of it, causes the clearing of the comparator 19, and the counters 25 and 27 and the flipflops 15, 17, 30, so that the several circuits of the transducer become ready for a new cycle of speed detection in the subsequent revolution of the shaft integral with the wheels 10 and 12.

I claim:

1. A transducer of the speed of rotation of a shaft rotated at a speed which can vary within a determined range of values intended to be subdivided into a preselected number of zones represented by respective zone limit values having increments which increase according to a predetermined function as the magnitude of the speed increases, each zone being further subdivided into a preselected number of intervals represented by respective interval limit values having increments which increase according to another predetermined function as the magnitude of the speed increases, so that the transducer has a degree of discrimination which is greater at low speed values than at high speed values, said transducer comprising:

first pulse generating means, operatively connected to the rotary shaft, for generating, at every revolution of the shaft, a train of first pulses in number at least equal to the number of the zones into which is subdivided the range of variation of the speed and having spacings which increase as according to said first predetermined function as the increments of said zone limit values increase and are also variable with the speed of rotation of the same shaft;

second pulse generating means for generating second constant frequency pulses;

first pulse counting means for counting said first pulses;

second pulse counting means for counting said second pulses;

comparing means, actuated by each pulse in said first pulse train for comparing the number of second pulses counted by said second counting means with a predetermined succession of reference numbers comprised between a minimum number and a maximum number, said comparing means providing an output signal if said counted number of second pulses is equal to any reference number, said output signal being capable of acting on said first and second counting means so as to stop their counting operation and to cause delivering of a first digital signal corresponding to the number of first pulses counted by said first counting means and representative of the zone of the speed zone in which the instantaneous speed value of the rotary shaft is comprised and, respectively of a second digital signal corresponding to the number of second pulses counted by said second counting means and representative of the interval of the zone of the speed range in which the instantaneous value of the speed of the rotary shaft is comprised; and resetting means for resetting said first and second counting means and said comparing means at the end of each revolution of the shaft.

2. A transducer according to claim 1, which comprises a first gate element having inputs connected to said first pulse generating means and a control means and an output connected to a counting input of said first counting means, and a second gate element having inputs connected to said second pulse generating means and to said control means and an output connected to a counting input of said second counting means, said control means being driven by said comparing means to generate a stop signal at each output signal delivered by said comparing means and being further driven by said resetting means to generate an enable signal at the end of each revolution of the shaft.

3. A transducer according to claim 2, which further comprises speed signal output means for combining said first and second digital signals into a single digital signal which represents the speed of rotation of the shaft, said output means being controlled by said control means so as to deliver said single digital signal only when said control means generate a stop signal.

4. A transducer according to claim 1, wherein said first pulse generating means comprises:
 a first wheel provided with as many reference marks as there are zones into which is subdivided the speed range, plus one; and
 a first sensor capable of delivering a pulse every time that a reference mark passes before it, the circular sectors defined by the reference marks having a width variable in the sense of rotation of the wheel according to the predetermined law of variation of said increments of the zone limit values of the speed range.

5. A transducer according to claim 4, characterized in that said resetting means comprises:
 a second wheel, integral with the shaft, provided with a single reference mark located between the last and the first reference marks of said first wheel; and
 a second sensor capable of delivering a reset pulse when said single reference mark passes before it.

* * * * *